United States Patent [19]

Rineer

[11] 4,126,060
[45] Nov. 21, 1978

[54] FRICTIONAL PLANETARY TRANSMISSION

[76] Inventor: Arthur E. Rineer, P.O. Box 115, Beulah, Mich. 49617

[21] Appl. No.: 722,697

[22] Filed: Sep. 13, 1976

[51] Int. Cl.² ............................................. F16H 13/06
[52] U.S. Cl. ..................................... 74/798; 74/750 R; 74/801
[58] Field of Search ...................... 74/798, 801, 750 R, 74/772, 785, 789

[56] References Cited

U.S. PATENT DOCUMENTS

| 1,737,295 | 11/1929 | Bronander | 74/772 |
| 1,752,542 | 4/1930 | Raule | 74/798 |
| 1,958,756 | 5/1934 | Jahraus | 74/798 |
| 2,672,739 | 3/1954 | Wildhaber | 74/801 X |
| 2,966,077 | 12/1960 | Wise | 74/798 |
| 3,244,026 | 4/1966 | DeKay | 74/798 |
| 3,327,566 | 6/1967 | Hewco | 74/798 |

FOREIGN PATENT DOCUMENTS

| 402,079 | 5/1968 | Australia | 74/798 |
| 1,921,479 | 11/1970 | Fed. Rep. of Germany | 74/750 R |
| 923,107 | 6/1947 | France | 74/798 |
| 494,348 | 5/1954 | Italy | 74/798 |
| 6,394 | 8/1894 | Sweden | 74/798 |

Primary Examiner—Samuel Scott
Assistant Examiner—Carl F. Pietruszka
Attorney, Agent, or Firm—Glenn B. Morse

[57] ABSTRACT

A speed reducer (or increaser) has a group of planetary members with a major diameter bearing on a central annular member in rolling contact. The minor diameters of these members bear preferably on the inside surfaces of axially-spaced ring sections in rolling engagement on flared surfaces provided on either the ring sections of the planetary members, or both. The rolling engagement is under pressure generated preferably by urging one ring member axially in a direction to grip the planetary members between the ring sections and the central annular member as a result of change of the rolling position on the flared surfaces. An intermediate member is associated with the axis of the planetary members to provide peripheral spacing of the planetary members, and control of their position.

4 Claims, 23 Drawing Figures

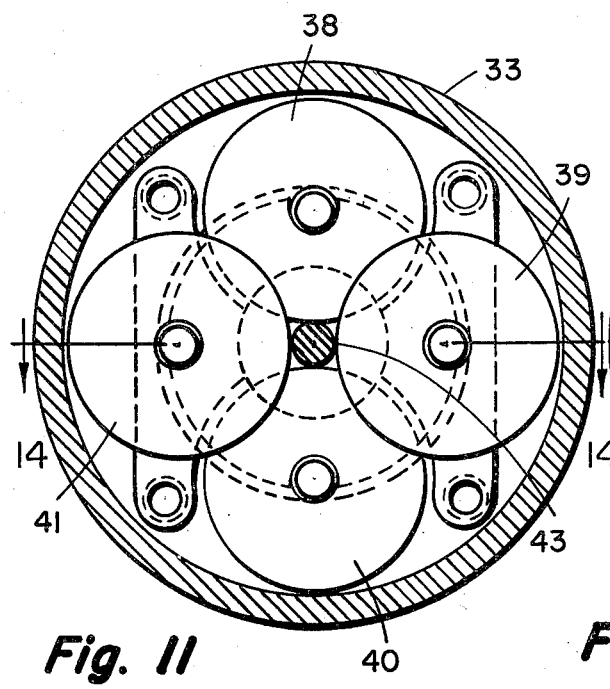
Fig. 11
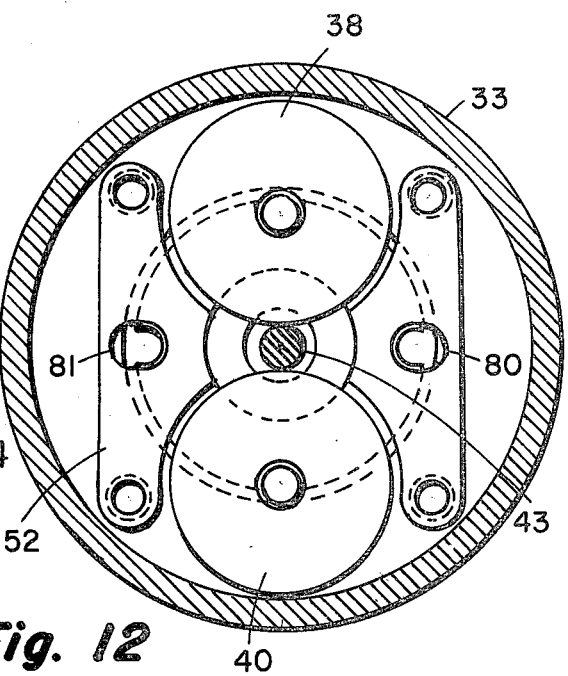
Fig. 12
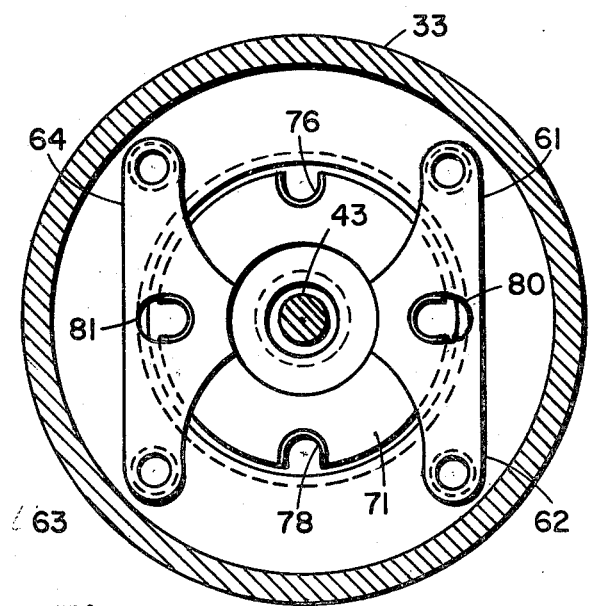
Fig. 13
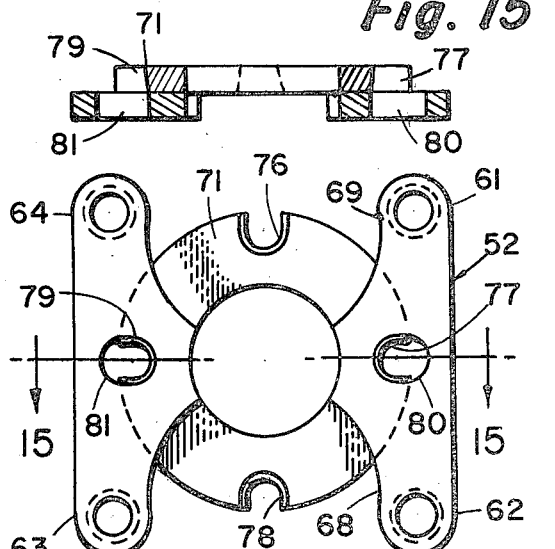
Fig. 16
Fig. 15
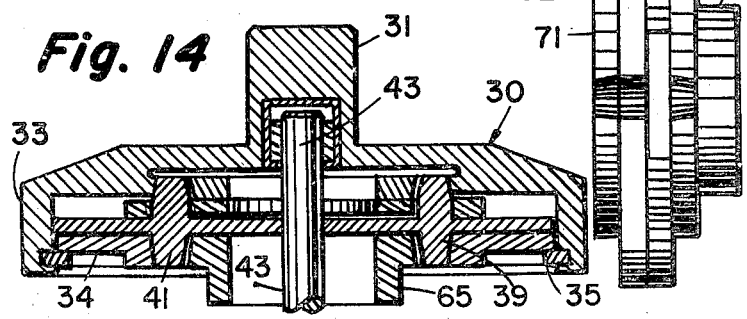
Fig. 14
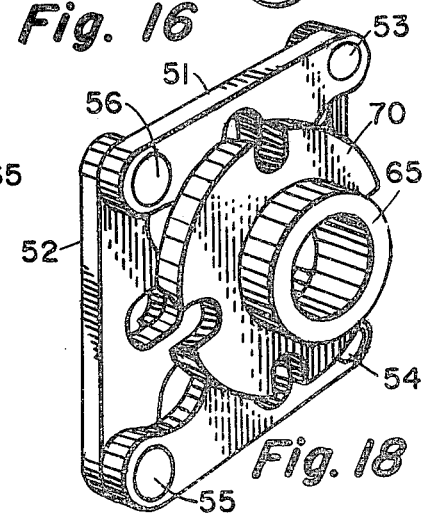
Fig. 17
Fig. 18

FRICTIONAL PLANETARY TRANSMISSION

BACKGROUND OF THE INVENTION

Planetary transmissions are frequently used as speed changers, either to reduce or increase the speed of one shaft with respect to another. Normally, these mechanisms provide coaxial shaft sections and a third reference controlling the fixed or rotative movement of the axis of the planetary members about the central shaft axis. Any one of these three references can be held fixed, or subject to braking action, with correspondingly modified output-input relationships of the other two references. Normally, planetary transmissions involve intermeshed gears, presenting noise and wear problems at unusually high speeds. In particularly small devices, these problems become acute. Planetary power transmissions operating on mere friction have been resorted to in an attempt to avoid this problem, but it has been extremely difficult to generate adequate but not excessive pressure at the interengaged rolling surfaces to assure freedom from slippage without undue wear. The present invention provides a solution to this problem.

SUMMARY OF THE INVENTION

Friction pressure for torque transmission in a planetary transmission is obtained by placing the planetary members in rolling engagement, at different diameters, with a central member and with the inside surface of of a ring, under pressure that binds the planetary member between these surfaces. The pressure is preferably generated by forming certain of the rolling surfaces in a flared or tapered configuration, and by inducing relative axial movement of the components to urge the rolling position to change on the tapered surfaces in a direction to increase the binding action. In the preferred form of the invention, the outer ring element is split into two sections, each having a beveled inner surface receiving the minor diameter of the planetary members in rolling contact. Arrangements are provided for altering the axial spacing between the ring sections to generate the rolling pressure. The intermediate member positioning the axis of the planetary members about the central shaft axis performs the usual functions, but is constructed in such a way as to accommodate a multi-planar assembly of planetary members.

DESCRIPTION OF THE DRAWINGS

FIG. 11 is a section on the plane 11—11 of FIG. 3.

FIG. 12 is similar to FIG. 11, but illustrates the assembly with two of the planetary members removed.

FIG. 13 is similar to FIG. 12, but shows the remaining two planetary members removed.

FIG. 14 is a section on the plane 14—14 of FIG. 11.

FIG. 15 is an axial section through a second component of the intermediate member.

FIG. 16 is an elevation of the intermediate member appearing in section of FIG. 15.

FIG. 17 is a side elevation showing the assembled sections of the intermediate member.

FIG. 18 is a perspective view of the assembly appearing in FIG. 17.

DESCRIPTION OF THE PREFERRED EMBODIMENTS

Figure 1:
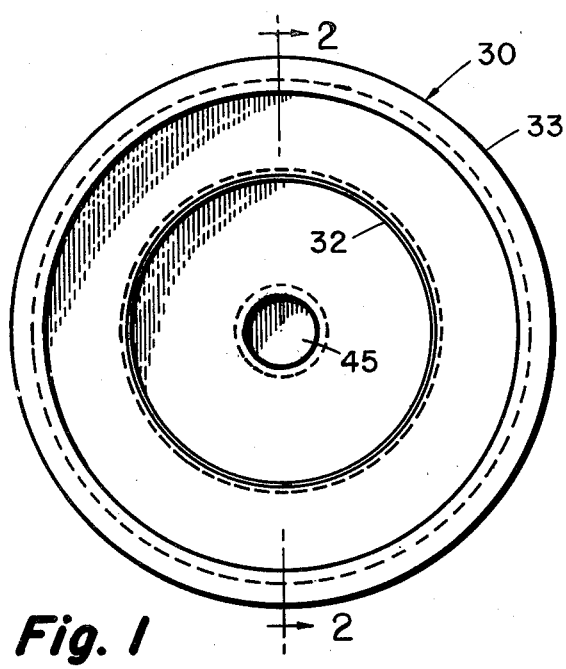
FIG. 1 is an elevation looking into the interior of the member providing one of the shaft sections of of the assembly, together with one of the ring sections associated therewith.
Figures 2, 3:
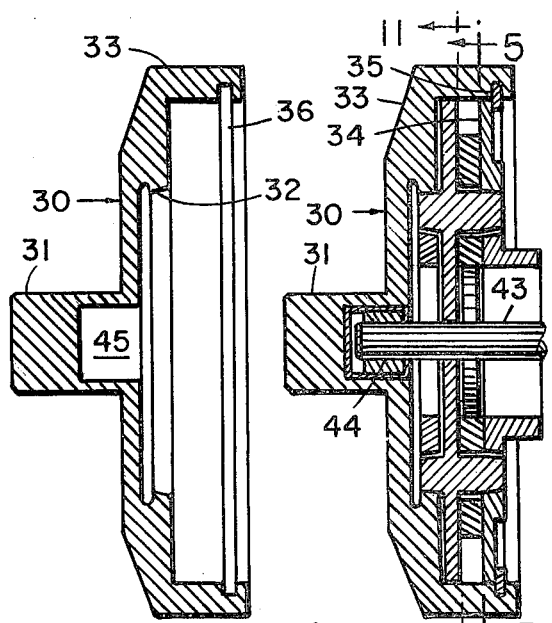
FIG. 2 is a section on the plane 2—2 of FIG. 1.
FIG. 3 is a section similar to FIG. 2, but showing the complete assembly of the speed reducer.
Figure 4:
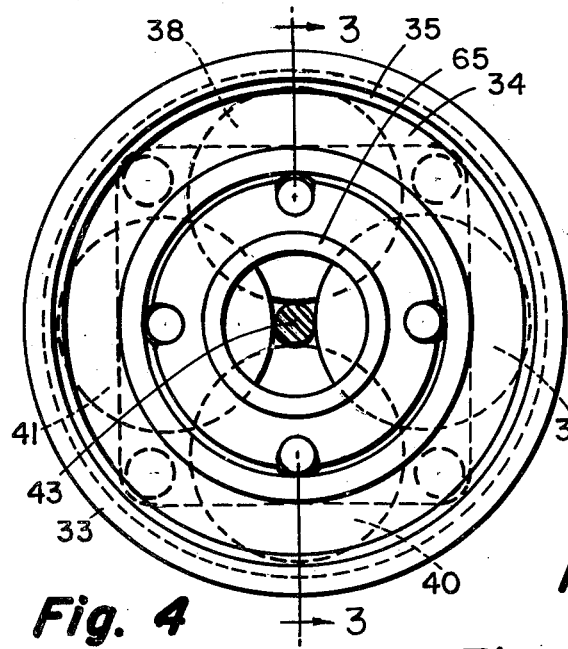
FIG. 4 is an elevation corresponding to FIG. 3, on a plane perpendicular to the central shaft axis.
Figure 5:
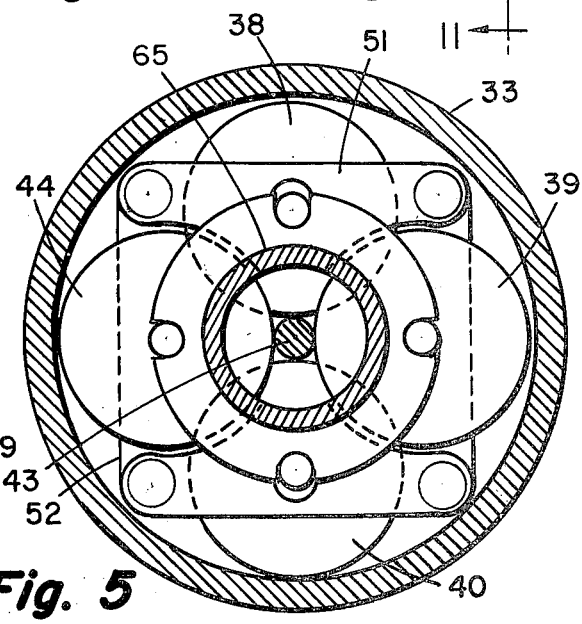
FIG. 5 is a section on the plane 5—5 of FIG. 3.

The assembly shown in FIG. 3 includes member 30 providing the shaft extension 31 and the internal ring surface 32. This member also has the axial extension 33 enclosing the working components of the device. The plate 34 is received within the extension 33, and is retained axially by the wedging ring 35 received within the groove 36. The plate 34 is biased continually to the left, as viewed in FIG. 3, by the tendency for the standard split retaining ring 35 to expand peripherally into the groove 36, with the result that the trapezoidal cross-sectional configuration of this ring (with a major thickness radially inward) providing the wedging action referred to. This relationship appears most clearly in FIG. 19. The plate 34 functions as a second ring section providing the internal surface 37 corresponding to the surface 32 on the member 30, and coaxial therewith. Preferably, the plate 34 is slightly resilient in a diaphragm sense, so that the wedging action contributed by the ring 35 is applied to the assembly as a resilient factor, rather than a positive placement. Under most circumstances, the inherent resilience of the plate 34 and the member 30 in approximately the illustrated proportions will provide enough resilience for proper functioning.

Figures 6, 7, 8:
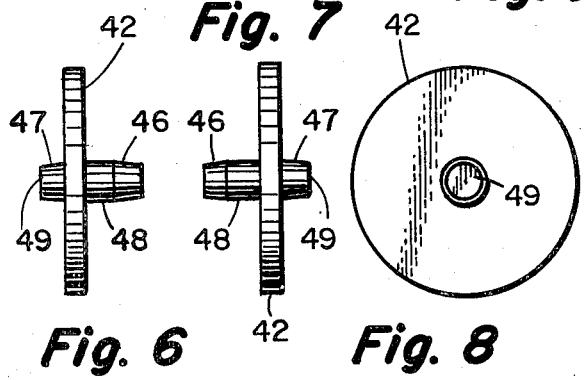
FIG. 6 is a side elevation showing one of the planetary members incorporated in the FIG. 3 assembly.
FIG. 7 is an elevation showing the reversed position of the planetary member incorporated in the FIG. 3 assembly.
FIG. 8 is a front view of the planetary member shown in FIG. 7.

A group of planetary members 38–41 are each constructed as shown in FIGS. 6–8. A central disc portion 42 is in rolling engagement with the periphery of the central cylindrical bearing member 43, which is preferably simply a short shaft. This shaft is received within the bearing unit 44 installed in the recess 45 in the shaft portion 31 of the member 30. The shaft section 31, the shaft 43, and the ring sections providing the surfaces 32 and 37 are thus coaxial.

The ring surfaces 32 and 37 are preferably conical, or flared, with the major diameters in facing relationship. The surfaces 46 and 47 of the shaft extensions 48 and 49 on opposite sides of the disc section 42 are preferably correspondingly beveled to mate with the surfaces 32 and 37. With this arrangement, any tendency for the surface 37 to axially approach the surface 32 will produce a corresponding tendency to push the planetary members radially inward with respect to the axis of the shaft 43 to produce pressure at the rolling engagement between those members. Corresponding pressure will, of course, be developed at the surfaces 32 and 37 of the ring sections, with the result that the pressure produces sufficient frictional forces to transfer the torque produced by the operation of the device, which involves relative rotation between the shaft 43 and the member 30. An interesting secondary benefit of this arrangement is the additional pressure at the surfaces 46-47 and the ring surfaces 37-32, resulting from the centrifugal force caused by the planetary movement of the members shown in FIG. 6. An analysis of the forces involved will show that the frictional requirements at the surfaces 37-32 are greater than those between the disc portions 42 and the central cylindrical member 43. The pressure at the ring sections will be equal to the pressure on the shaft 43, augmented by the effect of centrifugal force on the planetary members.

Figures 9, 10:
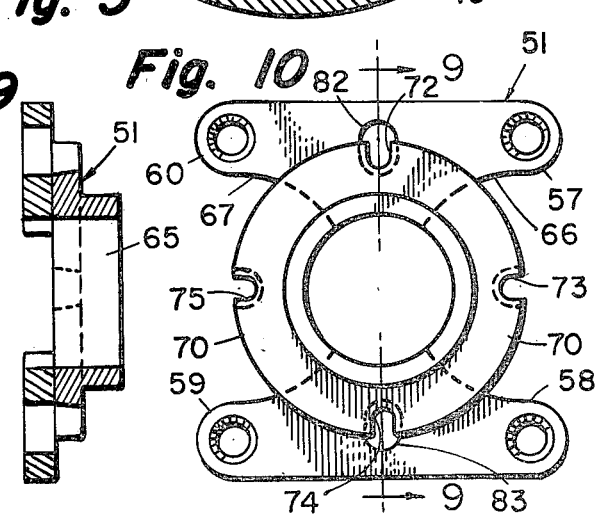
FIG. 9 is a section on the plane 9—9, showing one component of the intermediate member.
FIG. 10 is a plan view of a component of the intermediate member.

To complete a planetary transmission, it is normally desireable to incorporate an intermediate member associated exclusively with the position of the axes of the planetary members. This intermediate member is indicated at 50 in FIG. 22, and includes the components 51 and 52. These are secured together with rivets 53-56 traversing the arms 57-60 of the member 51, and the arms 61-64 of the component 52. The members 51 and 52 are similar, except for the presence of the collar extension 65, which appears exclusively on the member 51. The member 51 and 52 are rotated with respect to each other through an angle of 90° from positions of peripheral similarity, so that the arcuate surfaces 66 and 67 on the member 51 and the corresponding surfaces 68 and 69 on the member 52, are positioned to provide clearance for the disc portions 42 in the axially spaced planes in which they appear in the FIG. 3 assembly. The arms of each of the sections 51 and 52 are out of plane with respect to the flange portions 70 and 71, respectively, which are provided with peripheral notches as shown at 72-75 in FIG. 10 and 76-79 in FIG. 15. These notches receive the shaft extensions 48-49 of the planetary members to position these members angularly with respect to the axis of the device. Clearance openings for the ends of these shafts are also provided as shown at 80 and 81 in the arm sections appearing in FIG. 16, and 82-83 in FIG. 10. The collar 65 is adapted to engage the housing of a driving motor in fixed relationship, such as through the use of a press fit. The intermediate member, and thus the axes of the planetary members, are thus fixed in the modification of the invention illustrated in the drawings.

Figures 19, 20, 21:
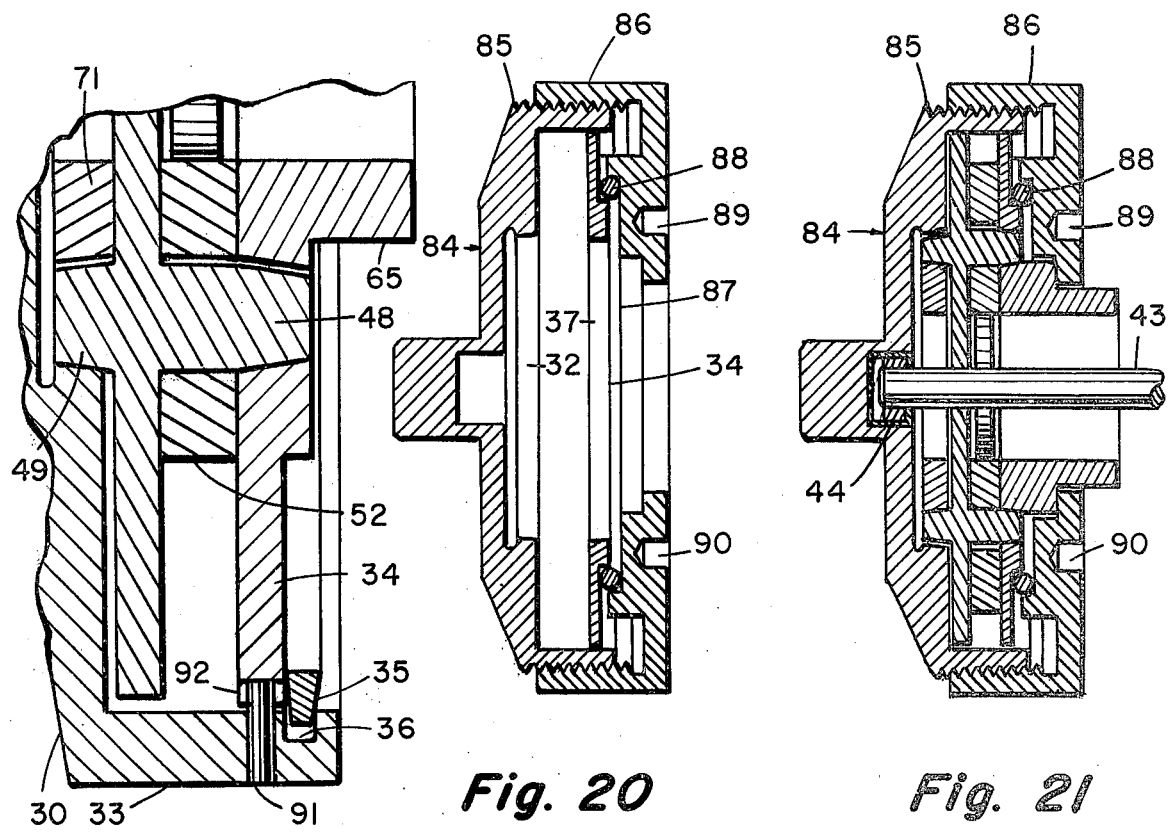
FIG. 19 is a fragmentary section on an enlarged scale showing the interengagement of the planetary members with the ring components.
FIG. 20 is an axial section of a modified form of the invention, showing exclusively the ring and biasing components.
FIG. 21 is an axial section of a complete assembly utilizing the FIG. 20 modification.

Referring to FIGS. 20 and 31, a modified form of the invention is illustrated in which the primary point of difference is in the arrangement for generating axial pressure urging the plate 34 in a direction to bring the surface 37 axially closer to the corresponding ring surface 32. The member 84 corresponds in function to the member 30 of FIG. 2, with the difference being the provision of the threaded periphery 85. This thread system is engaged by the retaining collar 86, which has a transverse surface 87 axially opposite the plate 34. A resiliently deformable O-ring 88 is annular, and is interposed between the surface 87 and the plate 34. Application of a wrench to the recesses 89 and 90 will thus alter the axial position of the retainer 86 with respect to the member 84, and thus apply a resilient pressure to the left, as viewed in FIG. 20, to the plate 34 to a variable degree of intensity. FIG. 21 illustrates the assembled relationship of a mechanism incorporating this form of adjustability, which is otherwise the same as that appearing in FIG. 3. In both of these arrangements, it is usually preferable, but optional, to incorporate a key providing a non-rotative relationship between the plate 34 and the member 30. This can be accomplished by the provision of the pin 91 pressed radially through the portion 33 of the member 30 to engage the notch 92 in the edge of the plate 34. The non-rotative relationship doubles the capability of transfer of torque at the internal ring surfaces.

It may be noted that the planetary members shown in FIGS. 6 and 7 will normally be identical, and merely reversed end-for-end for placement in either of the two planes of operation appearing in the drawings. Members 38 and 40, for example, are in a plane displaced toward the shaft extension 31 with respect to the planetary members 39 and 41. The rolling engagement of these planetary members with the ring surfaces can utilize a variety of forms of surface interengagement. The eccentricity of the shaft extensions 48 and 49 may, in some applications, produce a desirability for using flared surfaces having slightly different angles, so that the axial component of the bearing pressures will be equalized. Pressure applied to the periphery of the disc portions 42, because of the eccentricity, will obviously result in different reaction forces at the surfaces 46 and 47. To equalize the resultant axial components therefore requires a slight difference in cone angle, where the pressures involved might be high enough to make this discrepancy significant.

Figures 22, 23:
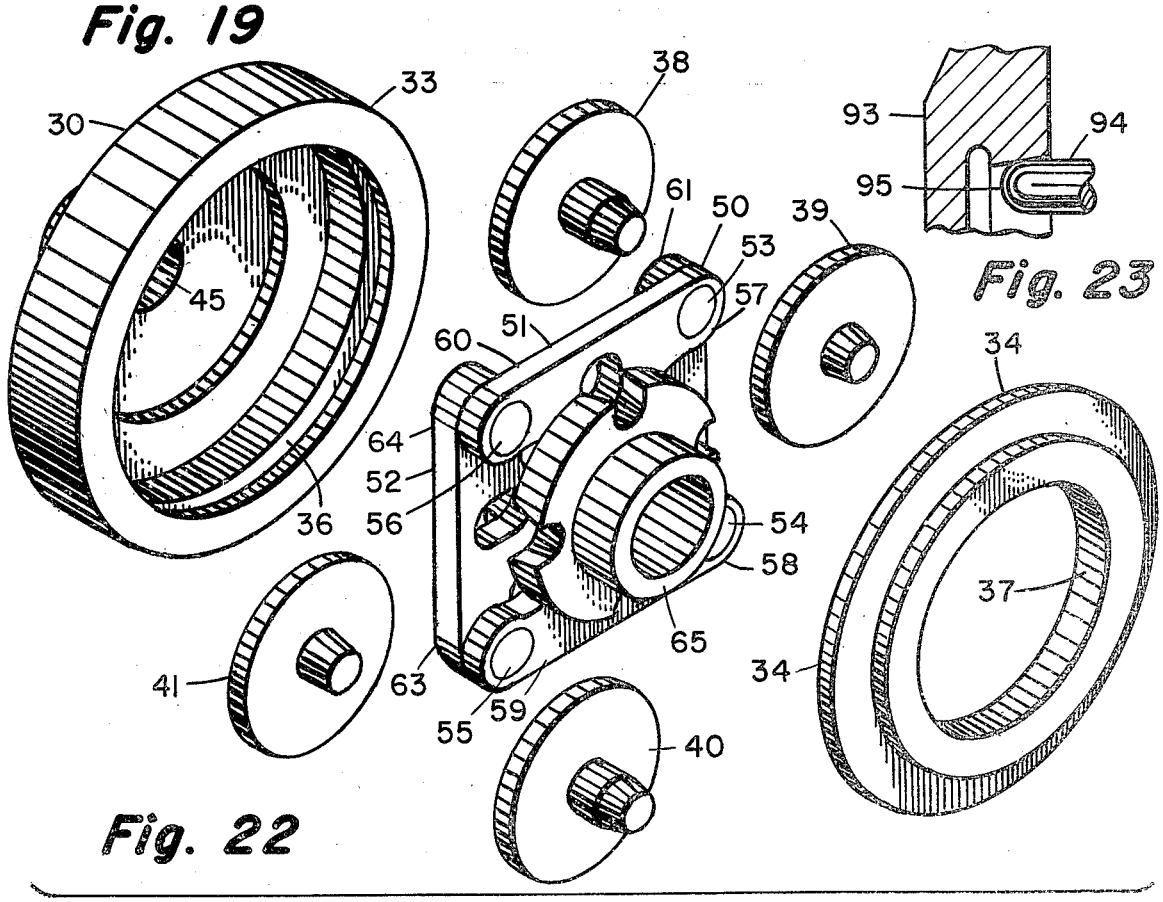
FIG. 22 is an exploded view showing the components of FIG. 3 assembly.
FIG. 23 illustrates a modified form of the invention with respect to the rolling interengagement between the planetary and ring members.

FIG. 23 illustrates a further possibility of surface relationship at the point of engagement of the planetary members with the ring surfaces. The ring surfaces can remain in conical, or other flared configuration, on the member 93, but the shaft extension 94 is ball-ended, as indicated at 95. Conical surfaces, while appearing to produce line contact, are somewhat deceptive, in the sense that the contact can not be maintained without slippage over the full axial length of these surfaces. One end is bound to be moving at a slightly different rate than the other, resulting from the conical configuration. The ball-ended surface 95 may be preferable in some applications where a positive point contact is preferable to a slightly skidding attempt at line contact. The particular applications involved, together with the materials forming the interengaged rolling surfaces, will normally determine the design in this regard.

The modifications of the present invention appearing in the drawings have been developed primarily for very small and high-speed applications, where the very smallness produces a special complication in the high-speed operation of the gears. A number of other applications are available on a much larger scale, such as the initial stages of a speed-reduction system associated with steam or internal combustion turbines. The high-speed of these turbine shafts is normally associated with relatively low torque, and the primary step-down from the main shaft speed can often be accomplished with a frictional system having the pressure-adjustment characteristic provided by the present invention. Successive stages involving higher torque transfer, and correspondingly lower speed, will normally be accomplished through the use of appropriate gearing.

I claim:

1. A planetary transmission system including ring means; a central annular bearing member coaxial with said ring means; a plurality of angularly-spaced planetary members having portions engaging said ring means and said central member, respectively, said planetary members having oppositely extending shaft portions engaging the inside surfaces of axially spaced sections of said ring means, said planetary members having a disc portion engaging said central annular bearing member axially between said ring sections, said planetary members being disposed with said disc portions in axially spaced overlapping relationship, said shaft portions of a particular planetary member being of different lengths, and said planetary members being similar and axially reversed with respect to the planetary member adjacent thereto; and an intermediate member rotatively receiving said planetary member and fixed with respect to the axis thereof, said planetary member having engagement with at least one of said ring means and central member on a continuous flared surface under pressure.

2. A planetary transmission system including ring means; a central annular bearing member coaxial with said ring means, said ring means and central bearing member having coaxial shaft portions associated respectively therewith; a plurality of planetary members having a disc portion bearing on said central annular member, and coaxial shaft portions on opposite sides of said disc portion, said planetary members having certain of said members disposed with the disc portions thereof in axially spaced overlapping relationship, said shaft portions of a particular planetary member being of different lengths, and said planetary members being similar and axially reversed with respect to the planetary member adjacent thereto; and a normally rotatively fixed intermediate member rotatively receiving said planetary member shaft portions, and fixed with respect to the axis thereof, said planetary member having engagement with at least one of said ring means and central member on a continuous flared surface under pressure.

3. A system as defined in claim 2, wherein said intermediate member has a plurality of axially overlaid sections each providing clearance portions for certain of said disc portions, and arms extending to positions in a space outside the axially projected peripheries of said disc portions, said arms being secured together.

4. A planetary transmission system including ring means having axially-spaced sections, one of said ring sections being on a plate, and the other of said ring sections having an axial extension surrounding said plate and the space between said ring sections; a central annular bearing member coaxial with said ring means; at least one planetary member having opposite shaft portions engaging said ring sections, respectively, and having a disc portion engaging said central member; and an intermediate member rotatively receiving said planetary member and fixed with respect to the axis thereof, said planetary member having engagement with at least one of said ring means and central member on a continuous flared surface under pressure; and biasing means including a retaining ring having axial engagement at the periphery of said plate, said retaining ring having a wedging engagement with a groove in said axial extension.

* * * * *